United States Patent
Tanaka (10) Patent No.: US 10,860,330 B2
(45) Date of Patent: Dec. 8, 2020

(54) ELECTRONIC APPARATUS HAVING VOLATILE MEMORY INCLUDING REFRESH CIRCUIT AND METHOD FOR BACKUP-REBOOTING THE ELECTRONIC APPARATUS

(71) Applicant: Brother Kogyo Kabushiki Kaisha, Nagoya (JP)

(72) Inventor: Tsutomu Tanaka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 155 days.

(21) Appl. No.: 16/128,768

(22) Filed: Sep. 12, 2018

(65) Prior Publication Data

US 2019/0087199 A1 Mar. 21, 2019

(30) Foreign Application Priority Data

Sep. 20, 2017 (JP) ................. 2017-180509

(51) Int. Cl.
| | |
|---|---|
| G06F 9/00 | (2006.01) |
| G06F 15/177 | (2006.01) |
| G06F 9/4401 | (2018.01) |
| G06F 3/12 | (2006.01) |
| G06F 13/16 | (2006.01) |
| G06F 1/3293 | (2019.01) |
| G06F 13/28 | (2006.01) |
| G06F 1/3296 | (2019.01) |

(52) U.S. Cl.
CPC .......... *G06F 9/4401* (2013.01); *G06F 1/3293* (2013.01); *G06F 1/3296* (2013.01); *G06F 3/123* (2013.01); *G06F 13/16* (2013.01); *G06F 13/28* (2013.01)

(58) Field of Classification Search
CPC .... G06F 9/4401; G06F 1/3284; G06F 1/3293; G06F 1/3296
See application file for complete search history.

(56) References Cited

U.S. PATENT DOCUMENTS

2015/0146235 A1* 5/2015 Sekine ............... G06K 15/4055
358/1.14
2018/0267598 A1* 9/2018 Pulivendula .......... G06F 1/3275

FOREIGN PATENT DOCUMENTS

JP 2015-101028 A 6/2015

* cited by examiner

*Primary Examiner* — Nitin C Patel
(74) *Attorney, Agent, or Firm* — Burr & Brown, PLLC (57) ABSTRACT

An electronic apparatus includes a first processor configured to restrict direct memory access by one or more peripheral circuits to a volatile memory, and thereafter make a transition from an active state to a sleep state, and a second processor configured to, after the first processor has been brought into the sleep state, set the volatile memory into a self-refresh mode in which a refresh circuit of the volatile memory periodically rewrites data stored in the volatile memory, and thereafter reboot the electronic apparatus.

17 Claims, 7 Drawing Sheets

ELECTRONIC APPARATUS HAVING VOLATILE MEMORY INCLUDING REFRESH CIRCUIT AND METHOD FOR BACKUP-REBOOTING THE ELECTRONIC APPARATUS

CROSS-REFERENCE TO RELATED APPLICATION

This application claims priority under 35 U.S.C. § 119 from Japanese Patent Application No. 2017-180509 filed on Sep. 20, 2017. The entire subject matter of the application is incorporated herein by reference.

BACKGROUND

Technical Field

Aspects of the present disclosure are related to an electronic apparatus and a method for safely backup-rebooting the electronic apparatus.

Related Art

An electronic apparatus, such as a printer, has firmware incorporated therein to control hardware elements included in the electronic apparatus. More specifically, the firmware is stored in a non-volatile rewritable memory of the electronic apparatus. In response to the electronic apparatus being booted, the firmware is transferred from the non-volatile rewritable memory into a DRAM ("DRAM" is an abbreviation of "Dynamic Random Access Memory") as a volatile memory, and is decompressed in a processor-executable format on the DRAM.

In order to add a new function and/or correct a malfunction in the electronic apparatus, new firmware may be provided, e.g., by a manufacturer of the electronic apparatus. After the new firmware is uploaded into a server as a firmware provider, the electronic apparatus is allowed to perform firmware updating. Specifically, for instance, a PC ("PC" is an abbreviation of "Personal Computer") may download the new firmware from the server and transmit the new firmware to the electronic apparatus. Thereafter, the electronic apparatus may receive the new firmware from the PC and overwrite old firmware stored in the non-volatile memory with the received new firmware. After the firmware updating, the electronic apparatus may reboot and decompress the new firmware in a processor-executable format.

Further, the electronic apparatus may have a function to reboot while holding data stored in the DRAM. Hereinafter, this function may be referred to as a "backup-rebooting function." Further, to reboot using the backup-rebooting function may be referred to as "backup-rebooting." In a case where the electronic apparatus is an MFP ("MFP" is an abbreviation of "Multi-Function Peripheral") having multiple functions such as a printing function, an image scanning function, a facsimile function, and the backup-rebooting function, the electronic apparatus may reboot while holding facsimile data and/or print data stored in the DRAM, by using the backup-rebooting function. For instance, in the backup-rebooting function, first, a CPU ("CPU" is an abbreviation of "Central Processing Unit") of the electronic apparatus transmits to the DRAM a command to make a transition to a self-refresh mode. In response to receipt of the command from the CPU, the DRAM makes a transition to the self-refresh mode, in which the DRAM periodically rewrites data thereinto at regular time intervals by a refresh circuit incorporated in the DRAM. Then, the CPU causes a system controller to reset integrated circuits including the CPU. At this time, the CPU resets the integrated circuits while maintaining electric power supply to the DRAM and maintaining a reset state of the DRAM. After resetting the integrated circuits, the CPU cancels the reset state of a memory controller included in the integrated circuits, and cancels the self-refresh mode of the DRAM. Then, the CPU decompresses the new firmware into a processor-executable format on the DRAM.

SUMMARY

When accessed externally in the self-refresh mode, the DRAM might be brought into an abnormal state. In such a case, for instance, the CPU might not be allowed to cancel the self-refresh mode of the DRAM. Therefore, after the DRAM has been brought into the self-refresh mode, the electronic apparatus needs to be controlled by one or more programs so as to prevent access by the CPU to the DRAM and prevent DMA ("DMA" is an abbreviation of "Direct Memory Access") by peripheral circuits of the CPU to the DRAM.

However, the CPU may make speculative access to the DRAM irrespective of the control by the programs. For instance, the speculative access by the CPU to the DRAM may be prohibited by inactivating a memory management unit. Nonetheless, when an operating system is designed based on an assumption that the operating system is used with the memory management unit maintained active, it is not preferred to inactivate the memory management unit.

Aspects of the present disclosure are advantageous to provide one or more improved techniques, for an electronic apparatus, which make it possible to safely backup-reboot the electronic apparatus.

According to aspects of the present disclosure, an electronic apparatus is provided, which includes a plurality of processors, a volatile memory including a refresh circuit, one or more peripheral circuits configured to make direct memory access to the volatile memory, and a bus via which the plurality of processors, the volatile memory, and the one or more peripheral circuits are interconnected to perform data communication with each other. The plurality of processors include a first processor configured to restrict the direct memory access by the one or more peripheral circuits to the volatile memory, and after restricting the direct memory access by the one or more peripheral circuits to the volatile memory, make a transition from an active state to a sleep state, and a second processor configured to, after the first processor has been brought into the sleep state, set the volatile memory into a self-refresh mode in which the refresh circuit of the volatile memory periodically rewrites data stored in the volatile memory, and after setting the volatile memory into the self-refresh mode, reboot the electronic apparatus.

According to aspects of the present disclosure, further provided is a method implementable by an electronic apparatus, the electronic apparatus including a first processor, a second processor, a volatile memory including a refresh circuit, one or more peripheral circuits configured to make direct memory access to the volatile memory, and a bus via which the first processor, the second processor, the volatile memory, and the one or more peripheral circuits are interconnected to perform data communication with each other. The method includes restricting, by the first processor, the direct memory access by the one or more peripheral circuits to the volatile memory, after restricting the direct memory access by the one or more peripheral circuits to the volatile memory, bringing the first processor into a sleep state from an active state, after the first processor has been brought into the sleep state, setting, by the second processor, the volatile memory into a self-refresh mode in which the refresh circuit of the volatile memory periodically rewrites data stored in the volatile memory, and after the volatile memory has been set into the self-refresh mode, rebooting the electronic apparatus by the second processor.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, illustrative embodiments according to aspects of the present disclosure will be described with reference to the accompanying drawings.

First Illustrative Embodiment

<Electrical Configuration of MFP>

Figure 1:
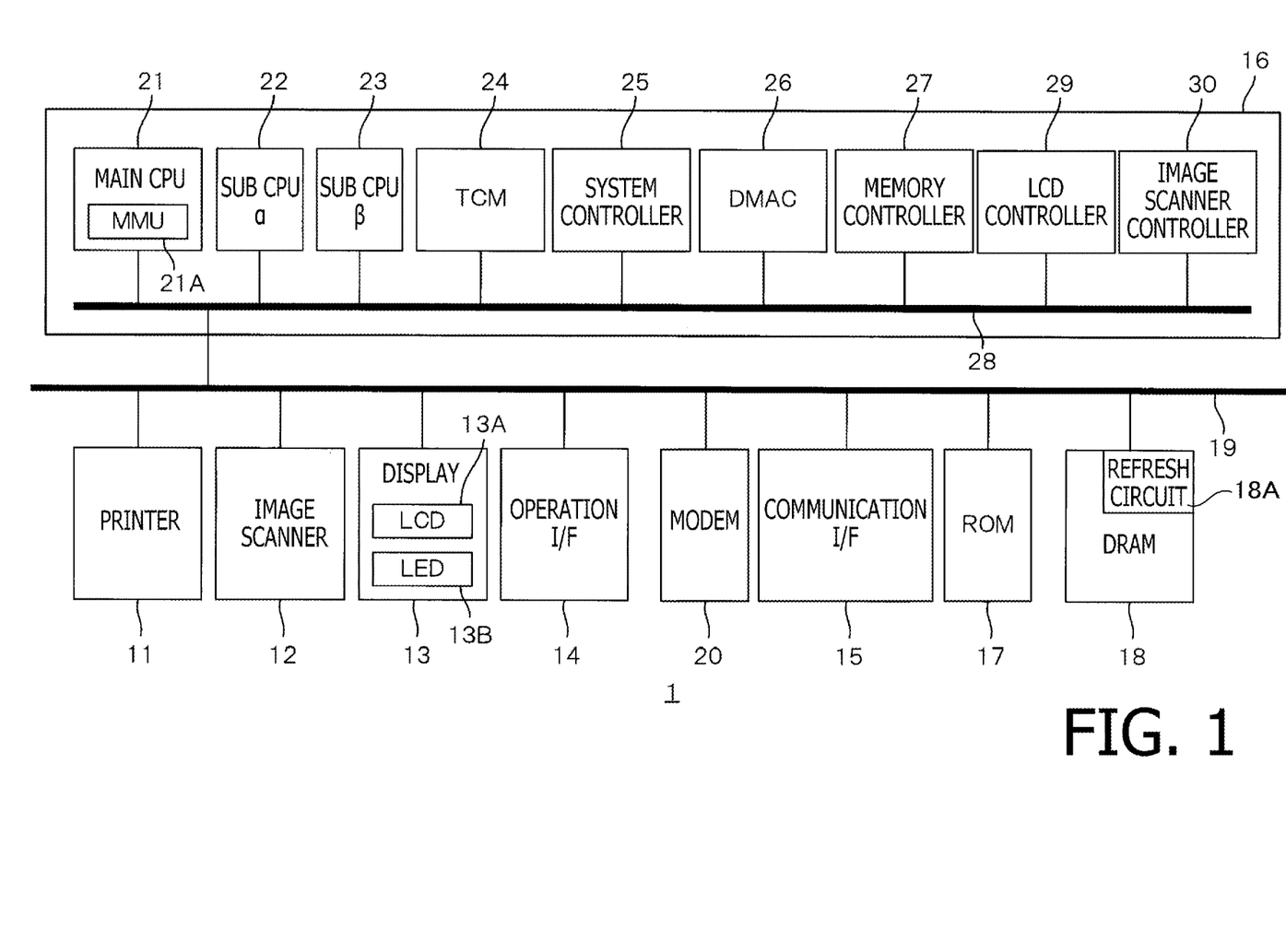
FIG. 1 is an electrical configuration of an MFP ("MFP" is an abbreviation of "Multi-Function Peripheral") in a first illustrative embodiment according to one or more aspects of the present disclosure.

FIG. 1 shows an electrical configuration of an MFP ("MFP" is an abbreviation of "Multi-Function Peripheral") 1 that is an electronic apparatus having multiple functions such as a facsimile function, a printing function, an image scanning function, and a copy function. The facsimile function is a function to transmit and receive image data via a public telephone network. The printing function is a function to form, on a sheet, an image based on image data received from an external device (e.g., a PC). The image scanning function is a function to scan an image of a document sheet and generate image data of the scanned image. The copy function is a function to scan an image of a document sheet and form the scanned image on a sheet.

The MFP 1 includes a printer 11, an image scanner 12, a display 13, an operation I/F ("I/F" is an abbreviation of "interface") 14, a communication I/F 15, an ASIC ("ASIC" is an abbreviation of "Application Specific Integrated Circuit") 16, a ROM 17, a DRAM 18, and a modem 20. The ROM 17 is a non-volatile rewritable memory such as a flash memory. The DRAM 18 is a volatile memory. The printer 11, the image scanner 12, the display 13, the operation I/F 14, the communication I/F 15, the ASIC 16, the ROM 17, the DRAM 18, and the modem 20 are interconnected via a bus 19 to perform data communication with each other.

The printer 11 is mainly used when the MFP 1 carries out the printing function or the copy function. The printer 11 is configured to form a color image or a monochrome image on each of sheets being fed on a sheet-by-sheet basis along a conveyance path, for instance, in an electrophotographic method or an inkjet method.

The image scanner 12 is mainly used when the MFP 1 carries out the facsimile function, the image scanning function, or the copy function. The image scanner 12 is configured to scan an image formed on a sheet and output image data of the scanned image, for instance, using a CIS ("CIS" is an abbreviation of "Contact Image Sensor") or a CCD ("CCD" is an abbreviation of "Charge Coupled Devices").

The display 13 includes an LCD 13A and an LED 13B. The LCD 13A is configured to display thereon various kinds of information and operable buttons. Further, the LCD 13A may have a touch panel integrally attached thereon. The LED 13B is provided separately from the LCD 13A. The LED 13B is configured to indicate a state of the MFP 1, for instance, by changing its own lighting state (e.g., a lighted state, a blinking state, and an unlighted state).

The operation I/F 14 is configured to, when a user operates an operable button displayed on the LCD 13A, receive an instruction corresponding to the operated button. Further, the operation I/F 14 is configured to, in response to receiving the instruction, transmit a signal (data) according to the instruction to the ASIC 16.

The modem 20 is mainly used when the MFP 1 carries out the facsimile function. The modem 20 includes one or more circuits configured to perform facsimile data communication with external devices via the public telephone network.

The communication I/F 15 includes one or more circuits configured to communicate with external devices (e.g., servers and PCs) via a computer network. For instance, the communication I/F 15 may have a LAN interface and/or a USB interface.

The ASIC 16 includes a main CPU 21, a sub CPU α 22, a sub CPU β 23, a TCM ("TCM" is an abbreviation of "Tightly Coupled Memory") 24, a system controller 25, a DMAC ("DMAC" is an abbreviation of "Direct Memory Access Controller") 26, a memory controller 27, an LCD controller 29, and an image scanner controller 30. The aforementioned elements included in the ASIC 16 are interconnected via an internal bus 28 within the ASIC 16, so as to perform data communication with each other. The internal bus 28 is connected with the bus 19, so as to perform data communication with each other. Further, the ASIC 16 may have a printer controller (not shown) for controlling the printer 11 and a communication-interface controller (not shown) for controlling the communication I/F 15.

When a particular situation, in which each of elements included in the MFP 1 stops a corresponding operation, persists for a particular period of time, the MFP 1 is brought into a power-saving state from a non-power-saving state. When the MFP 1 is in the power-saving state, the MFP 1 consumes a smaller amount of electricity than when in the non-power-saving state. Specifically, when the MFP 1 is in the power-saving state, a restricted amount of electricity is supplied to the printer 11, the image scanner 12, the display 13, the operation I/F 13, the modem 20, and the communication I/F 15.

The main CPU 21 has a speculative execution function such as speculative prefetch. The speculative prefetch is a function to previously load data expected to be used in the future from the DRAM 18 into a cache capable of operating at a higher speed than the DRAM 18, thereby enhancing a performance of the main CPU 21. Namely, the "speculative execution function" is a function for a CPU to preliminarily predict a specific process that would be needed in the future and execute the specific process. The main CPU 21 is configured to, when the MFP 1 is in the non-power-saving state, control basic operations of the MFP 1. The main CPU 21 includes an MMU ("MMU" is an abbreviation of "Memory Management Unit") 21A. The MMU 21A has a function to convert a virtual address into a physical address.

The sub CPU α 22 has a lower processing capacity than the main CPU 21. The sub CPU α 22 is configured to, when the MFP 1 is in the non-power-saving state, control the printer 11 that is an engine of the MFP 1. Specifically, when the MFP 1 is in the non-power-saving state, the sub CPU α 22 controls a high-voltage power supply to supply a high voltage to a particular part of the printer 11 and/or controls sheet conveyance in the printer 11. Thus, when the MFP 1 is in the non-power-saving state, instead of the main CPU 21, the sub CPU α 22 takes control of the high-voltage power supply and/or sheet conveyance. Thereby, a load to be placed on the main CPU 21 may be reduced. In other words, the MFP 1 may be controlled without sacrificing real-time controllability. Further, when the MFP 1 is in the power-saving state, the sub CPU α 22 controls basic operations of the MFP 1, except for controlling the lighting state (e.g., the lighted state, the blinking state, and the unlighted state) of the LED 13B included in the display 13. When the MFP 1 is in the power-saving state, the main CPU 21 does not control the basic operations of the MFP 1. Namely, when the MFP 1 is in the power-saving state, the sub CPU α 22, instead of the main CPU 21, controls the basic operations of the MFP 1. The sub CPU α 22 may also have a speculative execution function.

The sub CPU β 23 has a lower processing capacity than the main CPU 21. The sub CPU β 23 is designed to consume a smaller amount of electricity than the main CPU 21. The sub CPU β 23 is configured to, when the MFP 1 is in the power-saving state, control the lighting state (e.g., the lighted state, the blinking state, and the unlighted state) of the LED 13B included in the display 13. It is noted that, in the first illustrative embodiment, the sub CPU β 23 has a lower processing capacity than the sub CPU α 22.

For instance, the TCM 24 may include an SRAM ("SRAM" is an abbreviation of "Static Random Access Memory").

The system controller 25 is configured to reset the ASIC 16 in response to an instruction from the sub CPU β 23.

The DMAC 26 is configured to perform data transfer between the DRAM 18 and peripheral circuits for controlling the printer 11, the image scanner 12, the display 13, the operation I/F 14, the communication I/F, and the modem 20, without involving the sub CPU α 22 or the sub CPU β 23. The LCD controller 29 and the image scanner controller 30 may be included in the peripheral circuits.

The memory controller 27 is an integrated circuit for controlling reading data from the DRAM 18 and writing data into the DRAM 18. Further, the memory controller 27 has a refresh function to rewrite data stored in the DRAM 18 by periodically transmitting a refresh signal to the DRAM 18 at regular time intervals.

The LCD controller 29 is configured to control the LCD 13A of the display 13.

The image scanner controller 30 is configured to control the image scanner 12.

<Backup-Rebooting>

The MFP 1 has a backup-rebooting function to reboot while holding data stored in the DRAM 18.

There may be a case where, to add a new function and correct a malfunction in the MFP 1, new firmware is provided to the MFP 1, for instance, by a manufacturer of the MFP 1. In this case, specifically, the new firmware may be uploaded into a server as a firmware provider and then be downloaded from the server into the MFP 1 via the PC. The MFP 1 backup-reboots after completion of firmware updating to overwrite old firmware stored in the ROM 17 with the downloaded new firmware.

Figure 2A:
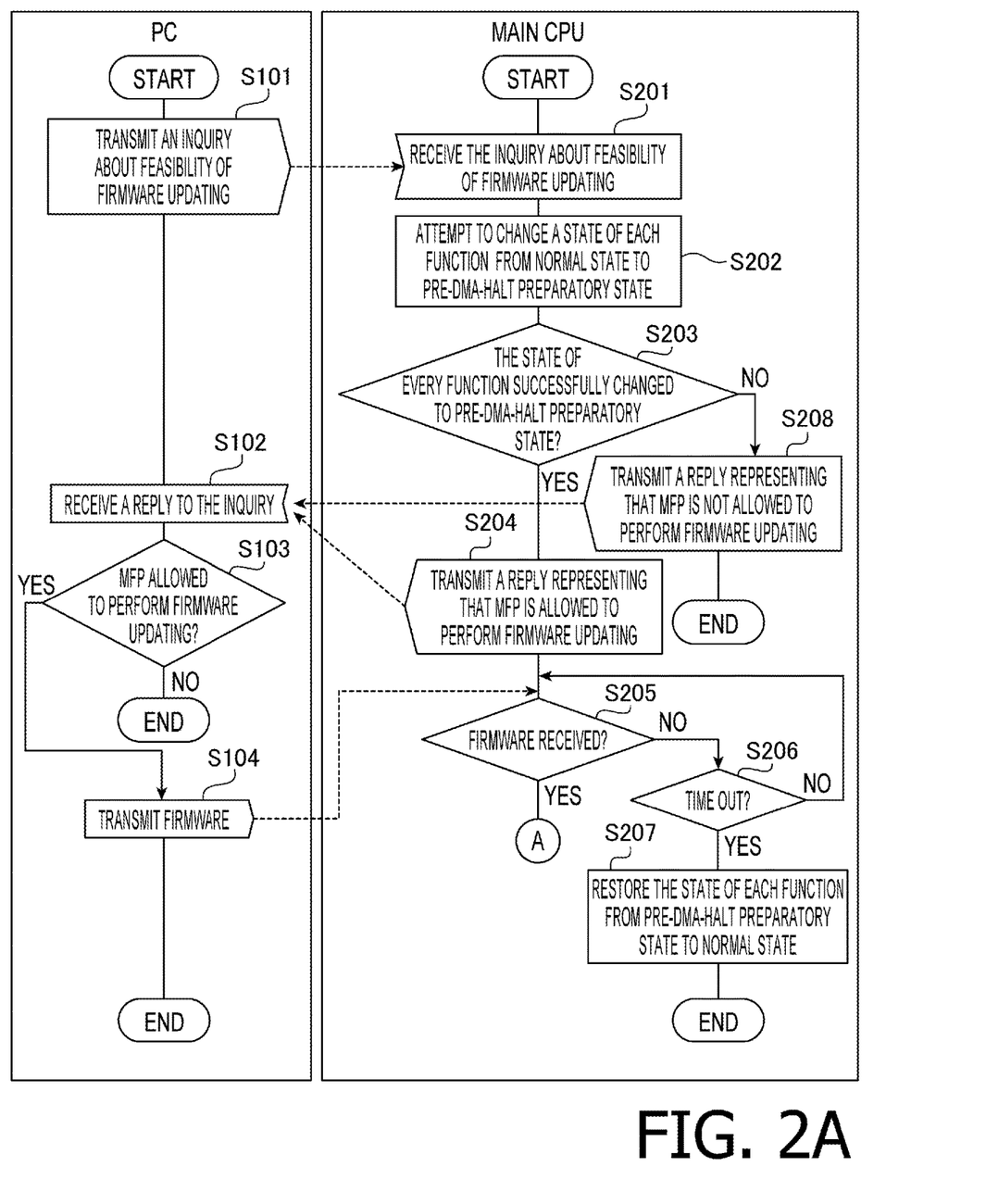
FIG. 2A is a flowchart showing procedures of a firmware transmitting process and a firmware receiving process in the first illustrative embodiment according to one or more aspects of the present disclosure.

In an attempt at the firmware updating, as shown in FIG. 2A, the PC transmits to the MFP 1 an inquiry about whether the MFP 1 is allowed to perform the firmware updating (S101).

In response to receiving, from the PC via the communication I/F 15, the inquiry about whether the MFP 1 is allowed to perform the firmware updating (S201), the main CPU 21 attempts to change a state of each function of the MFP 1 from a normal state to a pre-DMA-halt preparatory state (S202). Specifically, in response to receipt of the inquiry about whether the MFP 1 is allowed to perform the firmware updating, the main CPU 21 attempts to prohibit operations for particular functions including the facsimile function, the printing function, and the image scanning function. When operations for the printing function and the image scanning function are prohibited, of course, operations for the copy function using both the printing function and the image scanning function are prohibited. When any of the operations for the particular functions is not being performed, the main CPU 21 determines that it is possible to change the state of each of the particular functions from the normal state to the pre-DMA-halt preparatory state, and attempts to change the state of each particular function from the normal state to the pre-DMA-halt preparatory state. Meanwhile, when an operation for a particular function is being performed, the main CPU 21 determines that it is impossible to change the state of the particular function from the normal state to the pre-DMA-halt preparatory state, and abandons the attempt to change the state of the particular function from the normal state to the pre-DMA-halt preparatory state.

When having successfully changed the state of every particular function from the normal state to the pre-DMA-halt preparatory state (S203: Yes), the main CPU 21 transmits to the PC a reply representing that the MFP 1 is allowed to perform the firmware updating (S204).

After transmission of the reply representing that the MFP 1 is allowed to perform the firmware updating (S204), the main CPU 21 waits until receiving new firmware from the PC (S205).

While waiting for new firmware to be transmitted by the PC (S205: No), the main CPU 21 monitors whether a particular period of time has elapsed since the main CPU 21 began to wait for new firmware to be transmitted (i.e., since every particular function was brought into the pre-DMA-halt preparatory state) (S206).

When determining that the particular period of time has elapsed in a situation where the main CPU 21 is waiting until receiving new firmware from the PC (i.e., when time-out has been detected) (S206: Yes), the main CPU 21 restores the state of each particular function from the pre-DMA-halt preparatory state to the normal state (S207). Afterwards, the main CPU 21 terminates the present process (hereinafter referred to as a "firmware receiving process") to receive new firmware.

Meanwhile, when having failed to change the state of at least one of the particular functions from the normal state to the pre-DMA-halt preparatory state (S203: No), the main CPU 21 transmits to the PC a reply representing that the MFP 1 is not allowed to perform the firmware updating (S208). At this time, when there is, among the particular functions, a function brought into the pre-DMA-halt preparatory state, the main CPU 21 restore the state of the function to the normal state. Afterwards, the main CPU 21 terminates the firmware receiving process.

The PC receives, from the MFP 1, the reply to the inquiry about whether the MFP 1 is allowed to perform the firmware updating (S102). The received reply may represent that the MFP 1 is allowed to perform the firmware updating, or may represent that the MFP 1 is not allowed to perform the firmware updating.

Then, in response to receiving, from the MFP 1, the reply representing that the MFP 1 is allowed to perform the firmware updating (S103: Yes), the PC transmits new firmware to the MFP 1 (S104). Afterwards, the PC terminates the present process (hereinafter referred to as a "firmware transmitting process") to transmit the new firmware.

Meanwhile, in response to receiving, from the MFP 1, the reply representing that the MFP 1 is not allowed to perform the firmware updating (S103: No), the PC terminates the firmware transmitting process, without transmitting the new firmware to the MFP 1.

In response to receiving the new firmware from the PC via the communication I/F 15 (S205: Yes), the main CPU 21 of the MFP 1 stores the received firmware into the DRAM 18.

Figure 2B:
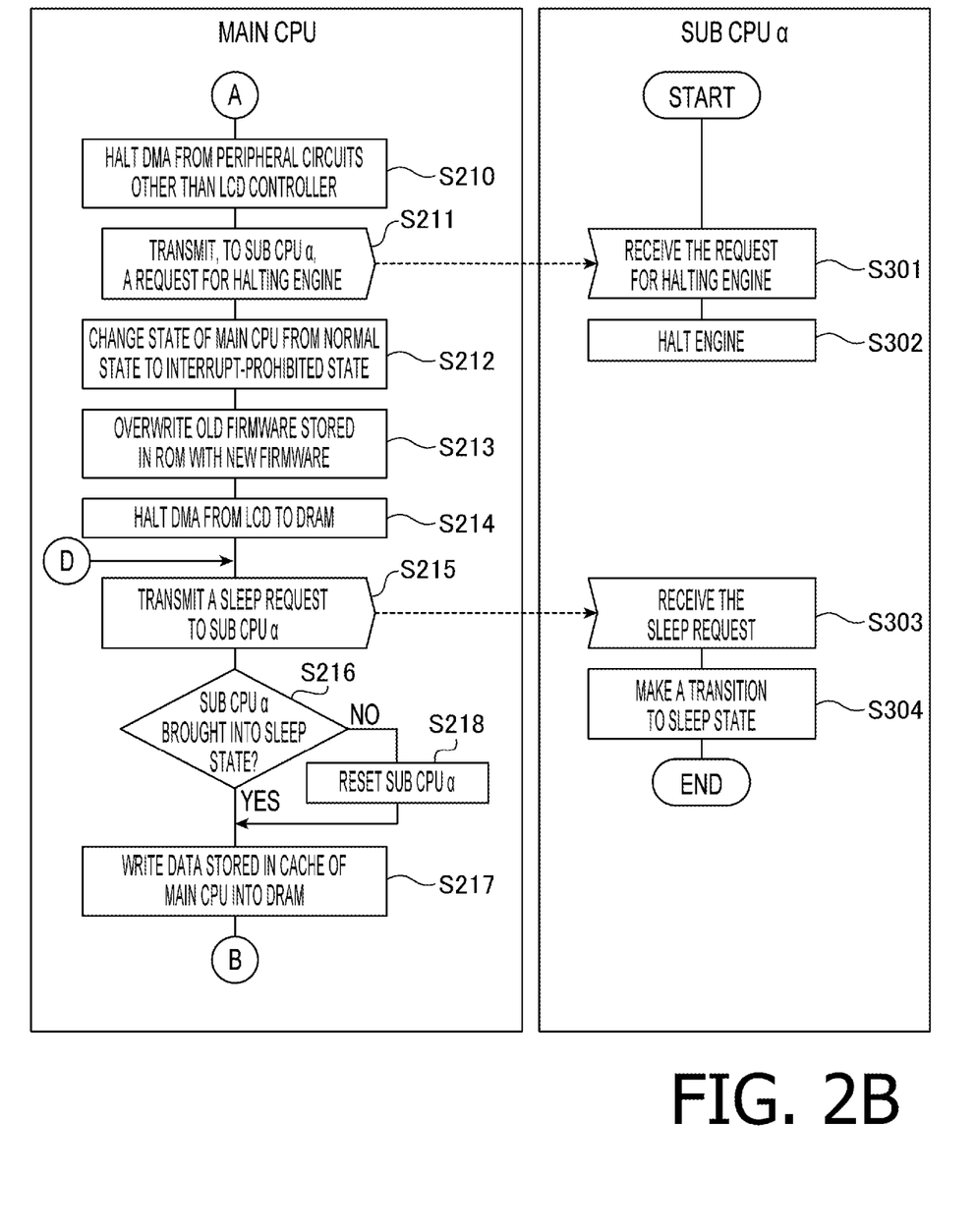
FIGS. 2B and 2C are flowcharts showing procedures of a DMA restriction and sleep transition process and a refresh mode transition and rebooting process in the first illustrative embodiment according to one or more aspects of the present disclosure.

Further, as shown in FIG. 2B, the main CPU 21 halts DMA by peripheral circuits (e.g., the image scanner controller 30) other than the LCD controller 29, except for DMA from the LCD 13A of the display 13 to the DRAM 18 via the DMAC 26 (S210).

Afterwards, the main CPU 21 transmits, to the sub CPU α 22, a request for halting (inactivating) the printer 11 which is the engine of the MFP 1 (S211).

In response to receiving the request for halting the engine from the main CPU 21 (S301), the sub CPU α 22 stops supplying electricity to elements included in the printer 11 (S302).

After transmission of the request for halting the engine, the main CPU 21 changes its own state from a normal state to an interrupt-prohibited state (S212). When the main CPU 21 is in the interrupt-prohibited state, an external interrupt to the main CPU 21 is prohibited. It is noted that, for instance, the external interrupt to the main CPU 21 may include notifications of various events. In this case, a process executable by the main CPU 21 is limited to a process currently in execution, and therefore, the main CPU 21 never begins a new process according to an external interrupt.

After brought into the interrupt-prohibited state, the main CPU 21 transfers the new firmware stored in the DRAM 18 to the ROM 17, and overwrites the old firmware stored in the ROM 17 with the new firmware (S213).

Thereafter, the main CPU 21 prohibits DMA from the LCD 13A of the display 13 to the DRAM 18 via the DMAC 26 by the LCD controller 29 (S214). Until this time, the DMA from the LCD 13A of the display 13 to the DRAM 18 via the DMAC 26 has been permitted, and therefore, a screen representing that the firmware updating is in progress has been displayed on the LCD 13A of the display 13. Thus, it may be prevented that the user worries unnecessarily about a malfunction of the MFP 1 due to the screen displayed until then disappearing from the LCD 13A.

Then, the main CPU 21 transmits, to the sub CPU α 22, a sleep request for making a transition from an active state to a sleep state (S215).

In response to receiving the sleep request from the main CPU 21 (S303), the sub CPU α 22 issues to itself a WFI ("WFI" is an abbreviation of "Wait For Interrupt") command to make a transition to the sleep state in which the sub CPU α 22 stops its own operation until externally interrupted (S304). In the first illustrative embodiment, the system controller 25 included in the ASIC 16 may determine whether the sub CPU α 22 is in the sleep state. Further, a state of each of the CPUs may be stored in a system register for a corresponding one of the CPUs. Namely, information on the state of each individual CPU may be acquired from the system register for the corresponding CPU. Alternatively, the state of each individual CPU may not be stored in the system register for the corresponding CPU. In this case, in response to a lapse of a predetermined period of time, it may be determined that the sub CPU α 22 has made a transition to the sleep state.

The main CPU 21 determines whether the sub CPU α 22 has been brought into the sleep state, based on information stored in the system register for the sub CPU α 22 (S216).

In response to determining that the sub CPU α 22 has been brought into the sleep state (S216: Yes), the main CPU 21 writes, into the DRAM 18, data stored in the cache of the main CPU 21 (S217).

Meanwhile, in response to determining that the sub CPU α 22 has not been brought into the sleep state (S216: No), the main CPU 21 resets the sub CPU α 22 (S218). Afterwards, the main CPU 21 writes, into the DRAM 18, data stored in the cache of the main CPU 21 (S217).

Afterwards, the main CPU 21 decompresses, in the TCM 24, a program to be executed by the sub CPU β 23 (S219).

At this time, the sub CPU β 23 is reset and inactive. After having decompressed, in the TCM 24, the program to be executed by the sub CPU β 23, the main CPU 21 cancels a reset state of the sub CPU β 23 (S220).

In response to the reset state of the sub CPU β 23 being canceled, the sub CPU 23 executes the program decompressed in the TCM 24 (S401). Processes to be implemented by execution of the program include a booting process to boot the sub CPU β 23.

After cancelling the reset state of the sub CPU β 23, the main CPU 21 makes a watchdog timer ineffective (S221) until the sub CPU β 23 is booted (S222: No). Thereby, it is possible to prevent the ASIC 16 from being reset due to overflow of the watchdog timer.

In response to determining that the sub CPU β 23 is booted (S222: Yes), the main CPU 21 transmits, to the sub CPU β 23, a request for backup-rebooting (S223).

Then, the main CPU 21 issues a DSB ("DSB" is an abbreviation of "Data Synchronization Barrier") command, thereby determining and setting commands up to the request for backup-rebooting (S224).

Thereafter, the main CPU 21 issues a WFI command to the main CPU 21 itself, thereby making a transition to a sleep state in which the main CPU 21 stops its own operation until externally interrupted (S225). Afterwards, the main CPU 21 terminates the present process (hereinafter referred to as a "DMA restriction and sleep transition process"). In the first illustrative embodiment, the system controller 25 included in the ASIC 16 may determine whether the main CPU 21 is in the sleep state. Further, the state of each of the CPUs may be stored in the system register for a corresponding one of the CPUs. Namely, information on the state of each individual CPU may be acquired from the system register for the corresponding CPU. Alternatively, the state of each individual CPU may not be stored in the system register for the corresponding CPU. In this case, in response to a lapse of a predetermined period of time, it may be determined that the main CPU 21 has been brought into the sleep state.

Figure 2C:
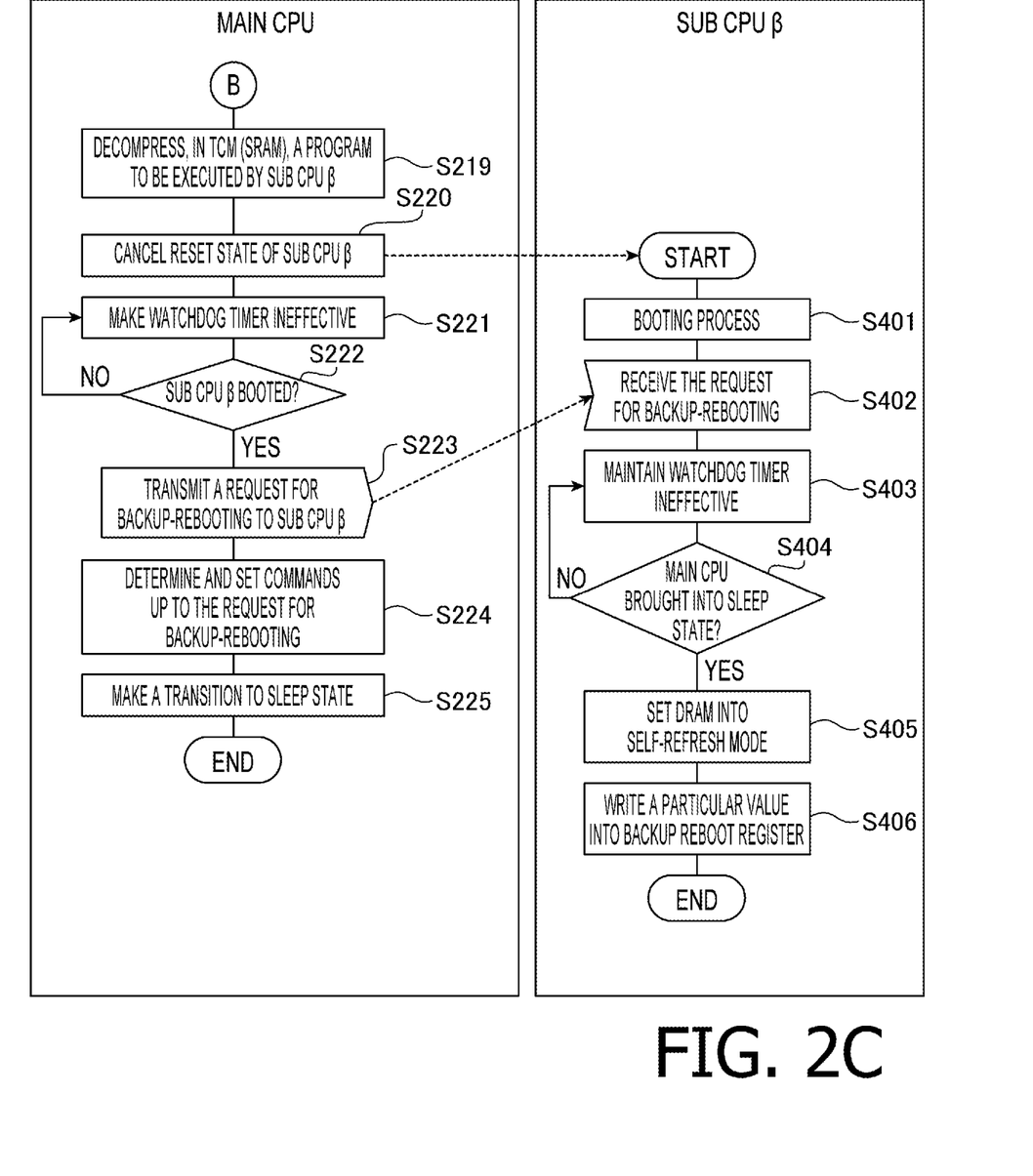

After booted in the booting process, in response to receiving the request for backup-rebooting from the main CPU 21 (S402), the sub CPU β 23 maintains the watchdog timer of the main CPU 21 ineffective (S403) until the main CPU 21 makes a transition to the sleep state (S404: No).

In response to determining that the main CPU 21 has made a transition to the sleep state, based on information stored in the system register for the main CPU 21 (S404: Yes), the sub CPU β 23 sets the DRAM 18 into the self-refresh mode (S405). The DRAM 18 has a refresh circuit 18A incorporate therein. In the self-refresh mode, the refresh circuit 18A periodically rewrites data stored in the DRAM 18. Thereby, in the self-refresh mode, the DRAM 18 is enabled to keep holding the data stored therein even without receiving a refresh signal from the memory controller 27.

Thereafter, the sub CPU β 23 writes a particular value (e.g., one) into a backup reboot register included in the system register for the sub CPU β 23 (S406). Then, the sub CPU β 23 terminates the present process (hereinafter referred to as a "refresh mode transition and rebooting process"). Afterwards, the ASIC 16 reboots the MFP 1. Nonetheless, the rebooting is not normal rebooting. Specifically, at this time, the ASIC 16 (more specifically, the sub CPU β 23) reboots the MFP 1 while maintaining electric power supply to the DRAM 18 and maintaining a reset state of the DRAM 18.

After the MFP 1 is rebooted, the sub CPU β 23 initializes the memory controller 27 and then cancels the self-refresh mode of the DRAM 18. Thereafter, the sub CPU β 23 decompresses, on the DRAM 18, the compressed new firmware stored in the ROM 17 in a processor-executable format. Then, the sub CPU β 23 jumps to a head address of the new firmware decompressed on the DRAM 18 and executes the new firmware from the head address. Thus, the backup-rebooting is completed.

Operations and Advantageous Effects

As described above, after the main CPU 21 has made a transition from the active state to the sleep state, the sub CPU β 23 performs the backup-rebooting. The backup-rebooting is to reboot while holding the data stored in the DRAM 18. In advance of the backup-rebooting, the DRAM 18 is brought into the self-refresh mode. Thereby, the refresh circuit 18A incorporated in the DRAM 18 begins to periodically rewrite the data stored in the DRAM 18.

Before the main CPU 21 makes a transition from the active state to the sleep state, the main CPU 21 restricts DMA to the DRAM 18 by the peripheral circuits for controlling the printer 11, the image scanner 12, the display 13, the operation I/F 14, the communication I/F 15, and the modem 20. Further, before the sub CPU β 23 performs the backup-rebooting, the main CPU 21 makes a transition from the active state to the sleep state. Therefore, after the DRAM 18 has been brought into the self-refresh mode, DMA to the DRAM 18 from the printer 11, the image scanner 12, the display 13, the operation I/F 14, the communication I/F 15, and the modem 20 is restricted. Further, even though the main CPU 21 has the speculative execution function, after the DRAM 18 is brought into the self-refresh mode, the main CPU 21 is restricted from accessing the DRAM 18. Consequently, this makes it possible to prevent occurrence of a malfunction such as the DRAM 18 being brought into an abnormal state, and thus makes it possible for the MFP 1 to safely perform the backup-rebooting.

Further, prior to restricting the DMA, the main CPU 21 causes each particular function (e.g., the facsimile function, the printing function, and the image scanning function) of the MFP 1 to make a transition from the normal state to the pre-DMA-halt preparatory state, thereby prohibiting operations for each particular function. Thereby, since the MFP 1 is restricted from performing the backup-rebooting while receiving facsimile data, it is possible to prevent interruption of the facsimile data reception. Further, it is possible to prevent occurrence of sheet jam due to interruption of image formation on a sheet or image scanning of a document sheet.

Then, after bringing each particular function into the pre-DMA-halt preparatory state, the main CPU 21 receives the new firmware from the PC. When a particular period of time has elapsed in a situation where the main CPU 21 is waiting until receiving the new firmware from the PC (i.e., when the main CPU 21 does not receive the new firmware within the particular period of time after each particular function has been brought into the pre-DMA-halt preparatory state), the main CPU 21 detects time-out and cancels the pre-DMA-halt preparatory state of each particular function, thereby restoring each particular function to the normal state. Thus, it is possible to prevent occurrence of processing delay due to the main CPU 21 waiting until receiving the new firmware. Further, it is noted that the main CPU 21 may cancel the pre-DMA-halt preparatory state of each particular function in response to receiving an instruction to cancel reception of the new firmware.

Further, before making a transition from the active state to the sleep state, the main CPU 21 causes the sub CPU α 22 to make a transition from the active state to the sleep state. Thereby, the sub CPU α 22 is restricted from accessing the DRAM 18 during the backup-rebooting. This makes it possible to further prevent occurrence of a malfunction such as the DRAM 18 being brought into an abnormal state, and thus makes it possible for the MFP 1 to more safely perform the backup-rebooting.

Further, when the sub CPU α 22 does not make a transition from the active state to the sleep state, the main CPU 21 resets the sub CPU α 22. Thereby, it is possible to prevent occurrence of processing delay due to the sub CPU α 22 not making a transition to the sleep state.

Second Illustrative Embodiment

In the aforementioned first illustrative embodiment, the backup-rebooting is performed after completion of the firmware updating. Nonetheless, the backup-rebooting may be performed after initialization of settings for a main body of the MFP 1.

The MFP 1 may be configured to reset various settings in response to user operations accepted via the operation I/F 14. Specifically, by operating the operation I/F 14, the user may cause the display 13 to display, on the LCD 13A, a reset menu selection screen as exemplified in FIG. 3.

Figure 3:
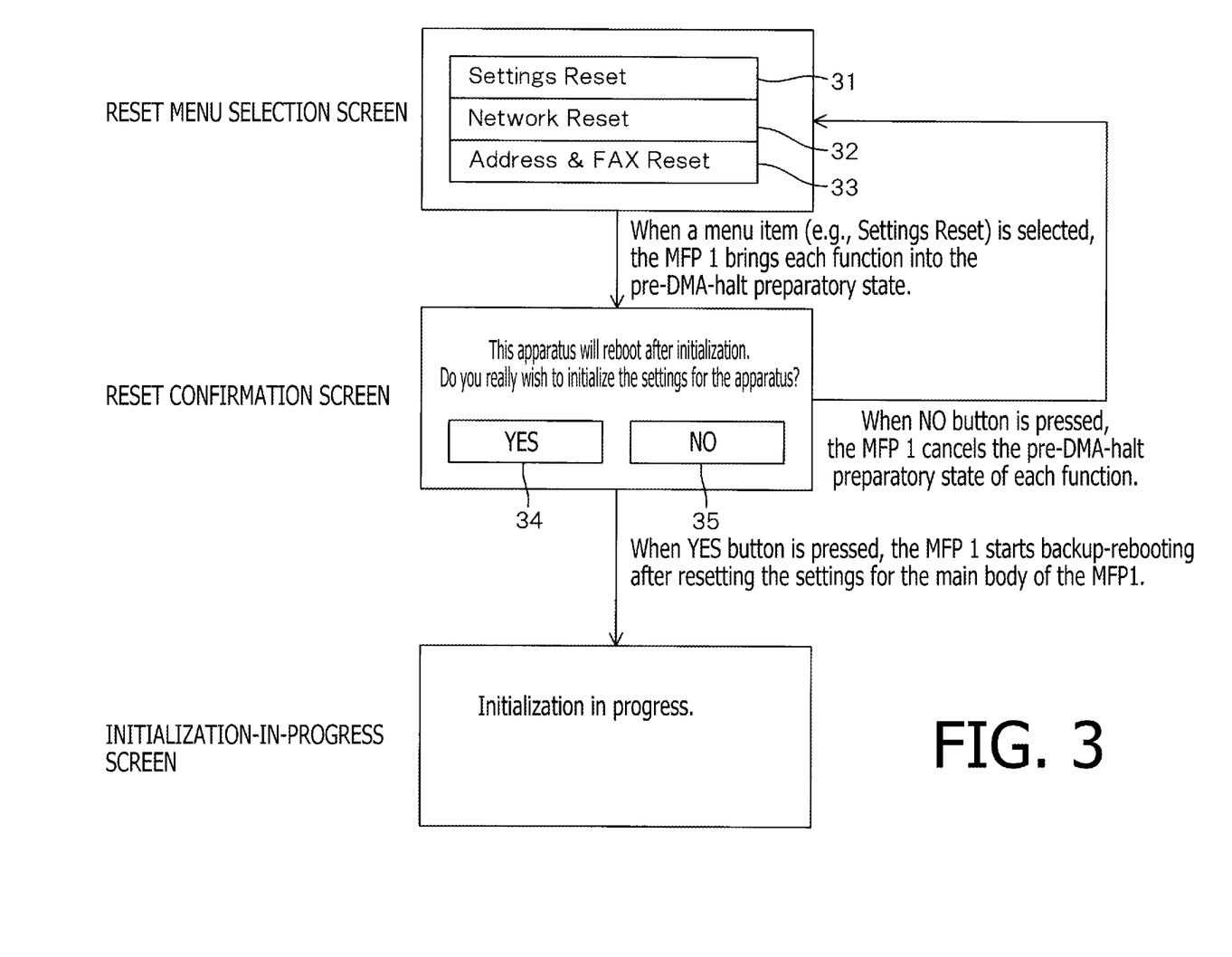
FIG. 3 exemplifies screens to be displayed on a display of the MFP in an initialization process to initialize (reset) settings for a main body of the MFP, in a second illustrative embodiment according to one or more aspects of the present disclosure.

The reset menu selection screen may include a settings-reset button 31, a network reset button 32, and a facsimile reset button 33. The settings-reset button 31 may be configured to, when operated, issue an instruction to reset the settings for the main body of the MFP 1. The network reset button 32 may be configured to, when operated, issue an instruction to reset settings for a network of the MFP 1. The facsimile reset button 33 may be configured to, when operated, issue an instruction to reset settings for the facsimile function and a phone number of a facsimile transmission destination. When the settings-reset button 31 is selected and operated, the main CPU 21 may start an initialization process as exemplified in FIGS. 4A and 4B.

Figure 4A:
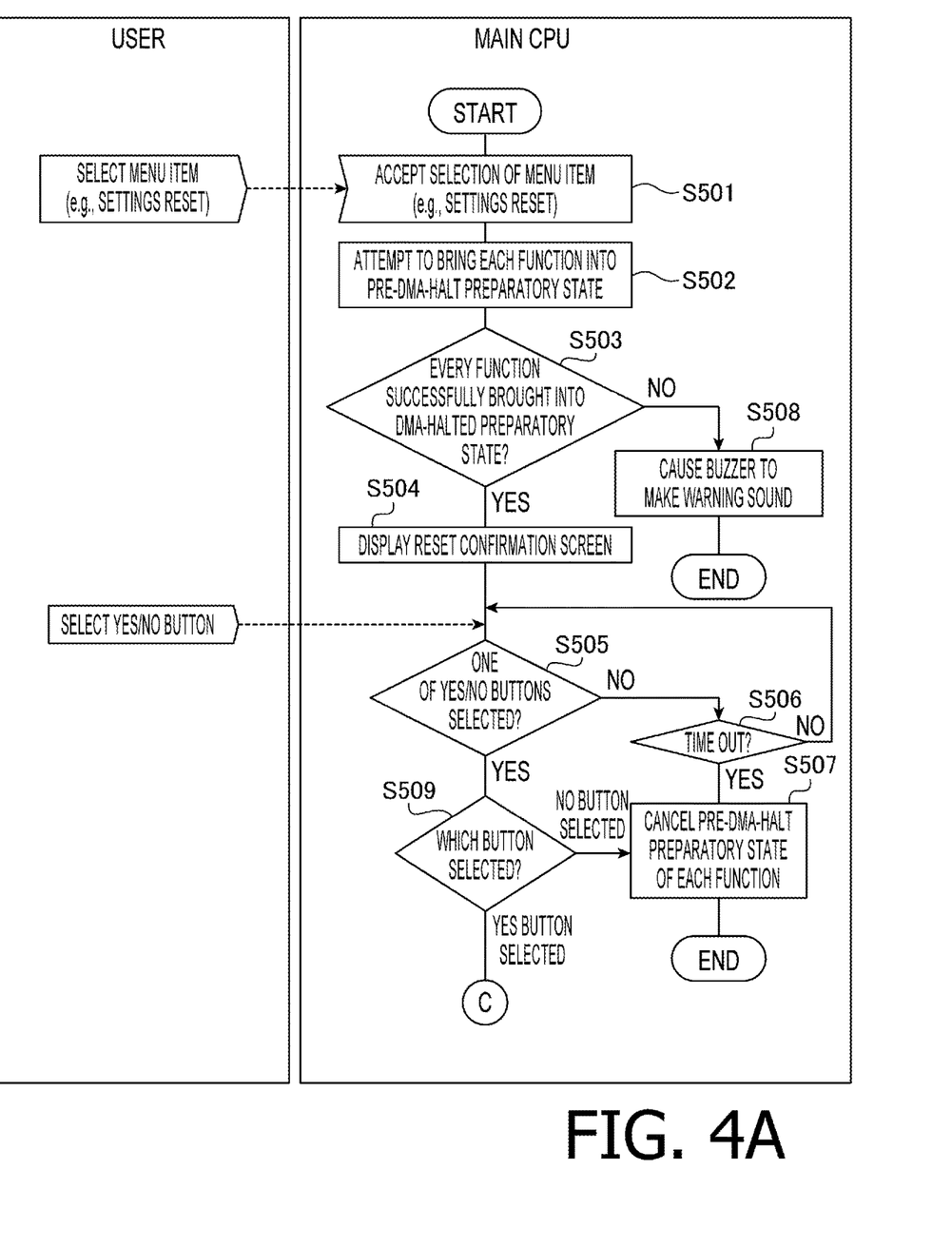
FIGS. 4A and 4B are flowcharts showing a procedure of the initialization process in the second illustrative embodiment according to one or more aspects of the present disclosure.

When the settings-reset button 31 is selected and operated (S501), the main CPU 21 attempts to cause each particular function of the MFP to make a transition from the normal state to the pre-DMA-halt preparatory state (S502).

When having successfully caused all of the particular functions, including the facsimile function, the printing function, and the image scanning function, to make a transition from the normal state to the pre-DMA-halt preparatory state (S503: Yes), the main CPU 21 controls the display 13 to display a reset confirmation screen (S504).

On the reset confirmation screen, there are displayed a message for inquiring of the user whether it is acceptable to reset the settings for the main body, an YES button 34 for providing an affirmative reply to the inquiry, and a NO button 35 for providing a negative reply to the inquiry.

After causing the display 13 to display the reset confirmation screen, the main CPU 21 waits until the user performs a selecting operation to select one of the YES button 34 and the NO button 35 (S505).

While waiting until the user performs the selecting operation to select one of the YES button 34 and the NO button 35, the main CPU 21 determines whether a predetermined period of time has elapsed since the main CPU 21 began to wait for the selecting operation to be performed (S506).

When determining that the predetermined period of time has elapsed since the main CPU 21 began to wait for the selecting operation to be performed (i.e., when time-out has been detected) (S506: Yes), the main CPU 21 restores the state of each particular function from the pre-DMA-halt preparatory state to the normal state (S507). Afterwards, the main CPU 21 terminates the initialization process.

Meanwhile, when having not successfully caused all of the particular functions to make a transition from the normal state to the pre-DMA-halt preparatory state (S503: Yes), for instance, the main CPU 21 may cause a buzzer (not shown) to make a warning sound (S508). Thereafter, the main CPU 21 terminates the initialization process.

Further, when determining that the NO button 35 has been selected and operated on the reset confirmation screen (S509: NO button selected), the main CPU 21 restores the state of each particular function from the pre-DMA-halt preparatory state to the normal state (S507). Thereafter, the main CPU 21 terminates the initialization process.

Figure 4B:
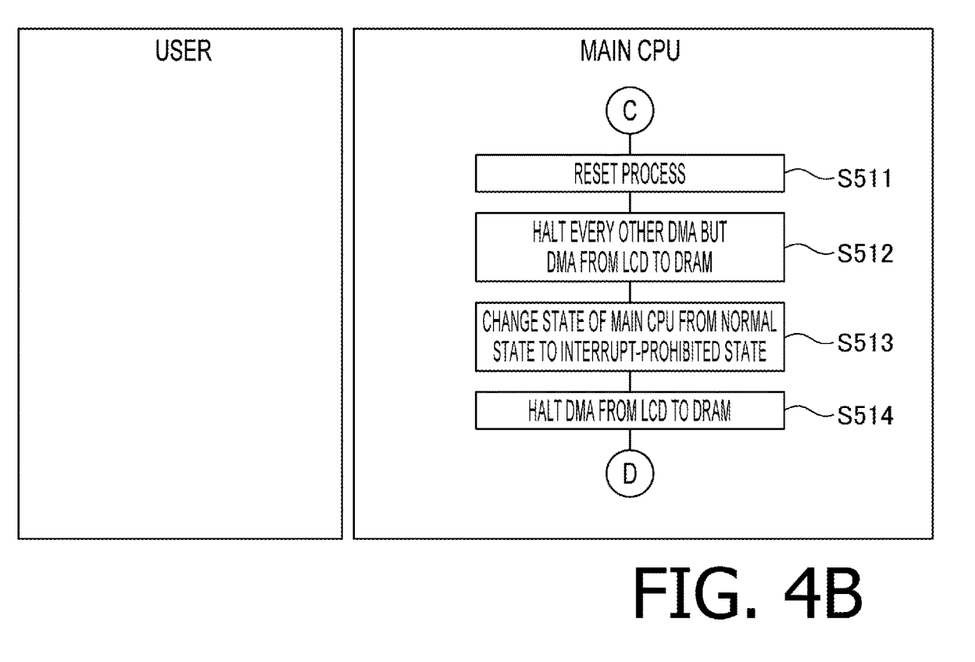

Meanwhile, when determining that the YES button 34 has been selected and operated on the reset confirmation screen (S509: YES button selected), the main CPU 21 performs a reset process to restore the settings for the main body to initial values (S511). Thereby, the settings for the main body are reset.

Afterwards, the main CPU 21 halts every other DMA via the DMAC 26 but the DMA from the LCD 13A of the display 13 to the DRAM 18 via the DMAC 26 (S512).

Then, the main CPU 21 changes its own state from the normal state to the interrupt-prohibited state (S513). Thereafter, the main CPU 21 prohibits the DMA from the LCD 13A of the display 13 to the DRAM 18 via the DMAC 26 by the LCD controller 29 (S514). Until this time, the DMA from the LCD 13A of the display 13 to the DRAM 18 via the DMAC 26 has been permitted, and therefore, a particular home screen has been displayed on the LCD 13A of the display 13. Thus, it may be prevented that the user worries unnecessarily about a malfunction of the MFP 1 in response to the screen displayed until then disappearing from the LCD 13A.

Afterwards, the main CPU 21 executes S215 (see FIG. 2B) and the subsequent steps, the sub CPU α 22 executes the steps S303 and S304, and the sub CPU β 23 executes the steps S401 to S406.

During a period of time from the beginning of the reset process until the main CPU 21 halts the DMA from the LCD 13A of the display 13 to the DRAM 18 via the DMAC 26 by the LCD controller 29, the main CPU 21 may keep controlling the display 13 to display, on the LCD 13A, an initialization-in-progress screen as shown in FIG. 3. The initialization-in-progress screen represents that the reset process is in progress and/or that the backup-rebooting is in progress.

Modifications

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein.

Associations between elements exemplified in the aforementioned illustrative embodiments and elements according to aspects of the present disclosure will be exemplified below. The MFP 1 may be an example of an "electronic apparatus" according to aspects of the present disclosure. The DRAM 18 may be an example of a "volatile memory" according to aspects of the present disclosure. The refresh circuit 18A may be an example of a "refresh circuit" according to aspects of the present disclosure. The bus 19 may be an example of a "bus" according to aspects of the present disclosure. The main CPU 21 may be an example of a "first processor" according to aspects of the present disclosure. The sub CPU β 23 may be an example of a "second processor" according to aspects of the present disclosure. The display 13 may be an example of a "display"

according to aspects of the present disclosure. The LCD controller 29 may be included in "one or more peripheral circuits" according to aspects of the present disclosure, and may be an example of a "display controller" according to aspects of the present disclosure. The communication I/F 15 may be an example of a "communication interface" according to aspects of the present disclosure. The sub CPU α 22 may be an example of a "third processor" according to aspects of the present disclosure. The printer 11 may be an example of a "printer" according to aspects of the present disclosure. The LED 13B of the display 13 may be an example of an "LED" according to aspects of the present disclosure.

What is claimed is:

1. An electronic apparatus comprising:
   a plurality of processors;
   a volatile memory comprising a refresh circuit;
   one or more peripheral circuits configured to make direct memory access to the volatile memory; and
   a bus via which the plurality of processors, the volatile memory, and the one or more peripheral circuits are interconnected to perform data communication with each other, the plurality of processors comprising:
   a first processor configured to:
      restrict the direct memory access by the one or more peripheral circuits to the volatile memory; and
      after restricting the direct memory access by the one or more peripheral circuits to the volatile memory, make a transition from an active state to a sleep state; and
   a second processor configured to:
      after the first processor has been brought into the sleep state, set the volatile memory into a self-refresh mode in which the refresh circuit of the volatile memory periodically rewrites data stored in the volatile memory; and
      after setting the volatile memory into the self-refresh mode, reboot the electronic apparatus.

2. The electronic apparatus according to claim 1, wherein the first processor has a speculative execution function to preliminarily predict a specific process expected to be needed and execute the specific process.

3. The electronic apparatus according to claim 1, further comprising a display,
   wherein the one or more peripheral circuits comprise a display controller configured to control the display, and
   wherein the first processor is further configured to:
      permit direct memory access from the display to the volatile memory by the display controller; and
      prohibit direct memory access to the volatile memory by every other peripheral circuit but the display controller.

4. The electronic apparatus according to claim 1, wherein the first processor is further configured to, before restricting the direct memory access by the one or more peripheral circuits to the volatile memory, set each of one or more functions executable by the electronic apparatus into a preparatory state in which an operation for a corresponding function is prohibited.

5. The electronic apparatus according to claim 4, wherein the one or more functions executable by the electronic apparatus include at least one of a facsimile function, a printing function, and an image scanning function.

6. The electronic apparatus according to claim 4, further comprising a communication interface configured to communicate with an external device,
   wherein the first processor is further configured to, before restricting the direct memory access by the one or more peripheral circuits to the volatile memory, receive firmware from the external device via the communication interface.

7. The electronic apparatus according to claim 6, wherein the first processor is further configured to cancel the preparatory state of each function, in one of:
   a case where the first processor does not receive firmware from the external device via the communication interface within a particular period of time after each function has been brought into the preparatory state; and
   a case where the first processor receives an instruction to cancel reception of firmware.

8. The electronic apparatus according to claim 4, configured to initialize settings for a main body of the electronic apparatus, and
   wherein the first processor is further configured to cancel the preparatory state of each function, in one of:
   a case where the first processor does not receive an instruction to initialize the settings for the main body within a particular period of time after each function has been brought into the preparatory state; and
   a case where the first processor receives an instruction to cancel initialization of the settings for the main body of the electronic apparatus.

9. The electronic apparatus according to claim 1, wherein the plurality of processors further comprises a third processor, and
   wherein the first processor is further configured to, before making a transition to the sleep state, transmit a sleep request to the third processor, the sleep request requesting the third processor to make a transition from an active state to a sleep state.

10. The electronic apparatus according to claim 9, further comprising a printer configured to form an image on a sheet, the electronic apparatus being configured to make a transition between a first state and a second state in which the electronic apparatus consumes a smaller amount of electricity than when in the first state,
    wherein the third processor is configured to, when the electronic apparatus is in the first state, perform a specific control operation for the printer, and
    wherein the first processor is configured to, when the electronic apparatus is in the first state, perform a control operation different from the specific control operation for the printer.

11. The electronic apparatus according to claim 10, wherein the first processor is further configured to:
    when the electronic apparatus is in the first state, control basic operations of the electronic apparatus; and
    when the electronic apparatus is in the second state, not control the basic operations of the electronic apparatus, and
    wherein the third processor is further configured to, when the electronic apparatus is in the second state, control the basic operations of the electronic apparatus.

12. The electronic apparatus according to claim 9, wherein the first processor is further configured to reset the third processor, when the third processor is not brought into the sleep state in response to the sleep request from the first processor.

13. The electronic apparatus according to claim 1, wherein the first processor is further configured to:

in a state where the second processor is reset and inactive, cancel the reset state of the second processor and boot the second processor; and after the second processor is booted, transmit a backup-rebooting request to the second processor, the backup-rebooting request requesting the second processor to set the volatile memory into the self-refresh mode and reboot the electronic apparatus.

14. The electronic apparatus according to claim 2, wherein the second processor does not have the speculative execution function.

15. The electronic apparatus according to claim 1, wherein the second processor has a lower processing capacity than the first processor.

16. The electronic apparatus according to claim 1, further comprising an LED configured to change a lighting state thereof, thereby indicating a state of the electronic apparatus, the electronic apparatus being configured to make a transition between a first state and a second state in which the electronic apparatus consumes a smaller amount of electricity than when in the first state, wherein the second processor is configured to control the LED when the electronic apparatus is in the second state.

17. A method for backup-rebooting an electronic apparatus, the method comprising:

restricting, by a first processor, a direct memory access by the one or more peripheral circuits to a volatile memory;

after restricting the direct memory access by the one or more peripheral circuits to the volatile memory, bringing the first processor into a sleep state from an active state;

after the first processor has been brought into the sleep state, setting, by a second processor, the volatile memory into a self-refresh mode in which a refresh circuit of the volatile memory periodically rewrites data stored in the volatile memory; and after the volatile memory has been set into the self-refresh mode, rebooting the electronic apparatus by the second processor, wherein the electronic apparatus comprises the first processor, the second processor, the volatile memory comprising the refresh circuit, the one or more peripheral circuits configured to make direct memory access to the volatile memory, and a bus via which the first processor, the second processor, the volatile memory, and the one or more peripheral circuits are interconnected to perform data communication with each other.

* * * * *